(12) United States Patent
Clark et al.

(10) Patent No.: US 10,339,473 B2
(45) Date of Patent: Jul. 2, 2019

(54) APPARATUS AND METHOD FOR EXECUTING ON-LINE PURCHASES

(71) Applicant: Walmart Apollo, LLC, Bentonville, AR (US)

(72) Inventors: Jimmie R. Clark, Fayetteville, AR (US); Christopher Soames Johnson, Pea Ridge, AR (US); Michael Lawerance Payne, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 358 days.

(21) Appl. No.: 15/210,084

(22) Filed: Jul. 14, 2016

(65) Prior Publication Data
US 2017/0032452 A1 Feb. 2, 2017

Related U.S. Application Data

(60) Provisional application No. 62/199,376, filed on Jul. 31, 2015.

(51) Int. Cl.
*G06Q 30/00* (2012.01)
*G06Q 10/02* (2012.01)
(Continued)

(52) U.S. Cl.
CPC .......... *G06Q 10/02* (2013.01); *G06Q 20/0453* (2013.01); *G06Q 30/0613* (2013.01);
(Continued)

(58) Field of Classification Search
CPC ............... G06Q 10/02; G06Q 20/0453; G06Q 20/0457; G06Q 30/0241–0277;
(Continued)

(56) References Cited

U.S. PATENT DOCUMENTS 6,754,636 B1 * 6/2004 Walker .................. G06Q 20/00
705/14.26
8,380,177 B2 2/2013 Laracey
(Continued)

FOREIGN PATENT DOCUMENTS

WO 2014138798 9/2014

OTHER PUBLICATIONS

"Buy a truck, get a free AK-47: used car dealership launches unusual promotion". Jon Swaine. Nov. 5, 2010 (Year: 2010).*
(Continued)

*Primary Examiner* — William J Allen
(74) *Attorney, Agent, or Firm* — Schmeiser, Olsen & Watts LLP

(57) ABSTRACT

Disclosed is an apparatus for executing on-line purchases. The apparatus includes three different servers, a ticket server, a doorman server, and a checkout server. The purchase tasks are spread among the servers, and timed, so that the on-line purchase can be handled without server overload and customers losing their place in line. The ticket server issues a purchase ticket to a customer. The purchase ticket includes a predetermined time after which the customer can present the ticket to purchase the purchase item. On or after the predetermined time, the customer presents the purchase ticket to the doorman server. The doorman server validates the ticket and checks that the predetermined time has passed. Once the doorman server approves the purchase ticket, the doorman server passes the purchase ticket to the checkout server with a purchase approval indicator. The checkout server then executes the on-line purchase of the purchase item.

9 Claims, 5 Drawing Sheets

(51) Int. Cl.
*G06Q 30/06* (2012.01)
*G06Q 20/04* (2012.01)
*G07B 15/00* (2011.01)
*G07B 11/00* (2006.01)

(52) U.S. Cl.
CPC ......... *G06Q 30/0637* (2013.01); *G07B 11/00* (2013.01); *G07B 15/00* (2013.01)

(58) Field of Classification Search
CPC ..... G06Q 30/06; G06Q 30/0601–0643; G06Q 30/08; G07B 1/00; G07B 5/00; G07B 5/06; G07B 5/08; G07B 11/00; G07B 11/11; G07B 15/00
See application file for complete search history.

(56) References Cited

U.S. PATENT DOCUMENTS

| | | | |
|---|---|---|---|
| 8,510,163 B2 | 8/2013 | Hess et al. | |
| 2003/0083934 A1* | 5/2003 | Fostick | G06Q 30/02 705/14.38 |
| 2003/0158782 A1* | 8/2003 | Thomson | G06Q 20/04 705/17 |
| 2005/0177386 A1* | 8/2005 | Essa | G06Q 10/02 705/5 |
| 2005/0246230 A1* | 11/2005 | Murray | G06Q 30/02 705/14.36 |
| 2008/0103913 A1 | 5/2008 | Leach et al. | |
| 2008/0239649 A1* | 10/2008 | Bradicich | G06F 1/183 361/725 |
| 2009/0076875 A1 | 3/2009 | Lert, Jr. et al. | |
| 2012/0078673 A1 | 3/2012 | Koke et al. | |
| 2012/0221383 A1* | 8/2012 | Shore | G11B 27/034 705/14.1 |
| 2014/0095219 A1 | 4/2014 | Zises | |
| 2014/0180960 A1 | 6/2014 | Sagfors et al. | |
| 2014/0244444 A1 | 8/2014 | Zhang | |
| 2015/0294284 A1* | 10/2015 | Soon-Shiong | G06Q 30/06 705/14.23 |

OTHER PUBLICATIONS

Examination Report in counterpart GB Patent Application No. GB1612662.5, dated Sep. 26, 2018; 8 pages.
Abbreviated Examination Report in counterpart UK Patent Application No. 1612662.5, dated Jan. 17, 2017; 7 pages.

* cited by examiner

APPARATUS AND METHOD FOR EXECUTING ON-LINE PURCHASES

CROSS REFERENCE TO RELATED APPLICATION

This application claims priority to U.S. Provisional Patent Application Ser. No. 62/199,376 to Walmart Stores Inc., filed Jul. 31, 2015 and entitled "Apparatus and Method For Executing On-Line Purchases", which is hereby incorporated entirely herein by reference.

BACKGROUND OF THE INVENTION

Technical Field

This invention relates to retail purchases and specifically to an apparatus for executing on-line purchases.

State of the Art

When limited quantity items are sold over the internet (on-line), the computer servers that process the purchase checkout can become overloaded due to high demand. When a server runs out of processing power and depth to handle the number of concurrent users trying to search for the item, add it to their cart, and make the purchase, some users begin to get dropped from their internet session and have to begin the process over again. In some cases, a customer who had a place "in line" to purchase the item, will lose their place in line because of a server overload, and may possibly find they cannot purchase the item because the quantity has run out once they try again. This causes anger and frustration towards the retailer, and does not contribute to good customer relationships.

Accordingly, what is needed is a system for handling on-line purchases which puts users in line and executes their on-line purchases smoothly and without dropping customers or making them lose their place in line.

DETAILED DESCRIPTION OF EMBODIMENTS OF THE INVENTION

Figure 1:
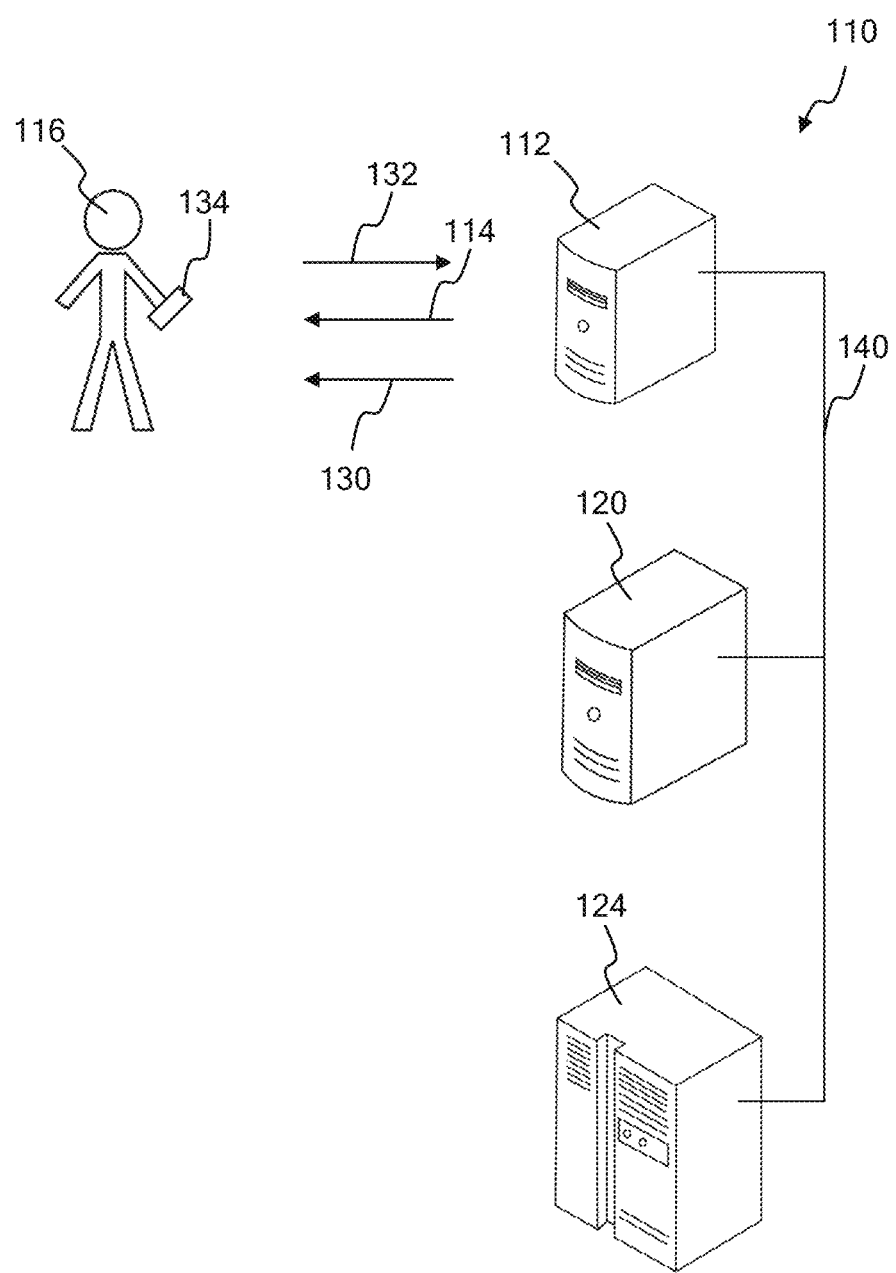
FIG. 1 shows a simplified illustration of a system for executing on-line purchases.

As discussed above, embodiments of the present invention relate to retail purchases and specifically to an apparatus for executing on-line purchases. Disclosed is an apparatus that includes three different servers, a ticket server, a doorman server, and a checkout server. The tasks involved in the on-line purchase of a purchase item are spread among the three servers, and timed, so that the on-line purchase can be handled efficiently and accurately, and without customers losing their place in line. The ticket server issues a purchase ticket (usually an electronic ticket) to the customer. The purchase ticket includes a predetermined time after which the customer can present the ticket to purchase the purchase item. On or after the predetermined time indicated on the purchase ticket, the customer presents the purchase ticket to the doorman server. The doorman server validates the ticket and checks that the predetermined time has passed. Once the doorman server approves the purchase ticket, the doorman server passes the purchase ticket to the checkout server with a purchase approval indicator. The checkout server then executes the on-line purchase of the purchase item. The use of multiple servers to handle the on-line purchase and time the purchase allows multiple lower-size, lower-capability, and lower-cost servers to be used to handle preliminary purchase tasks. The financial transaction portion of the on-line sale is still handled by a checkout server. However, the checkout server will not be overloaded with requests because the ticket server will control the timing of the purchase requests being presented to the checkout server. And much of the preliminary data-capturing can be handled by the ticket server or the doorman server, leaving the financial transaction task to be performed in a timed and efficient manner. This apparatus and technique will largely eliminate purchase overload on the checkout server, creating a customer-friendly on-line purchase experience.

Some products are so sought after that when they go on sale, people get in line to purchase them. Concert tickets; desired toys and other products; fuel when supply is low. These products have all motivated customers to stand in line to get a chance at purchasing a product. On-line purchases are no different. When the latest children's toy or smart phone goes on sale, the servers that handle the on-line purchases get overloaded, and can begin to drop customers or, even worse, crash completely. Servers get overloaded with customers trying to search for the purchase item, add it to their cart, and complete the financial transaction as quickly as possible. Some customers make it most of the way through the process, only to get dropped by the server during the financial transaction step when the server gets overloaded. The customer then has no choice but to go to the 'end of the line' and start over again, which could mean they do not get to purchase the purchase item. Customers get frustrated and develop negative feelings towards the retailer when they lose their place "in line" to make an on-line purchase. The disclosed apparatus and method will largely eliminate the overload on servers executing the on-line purchases, allowing users to get a place in line, keep their place in line, and execute their on-line purchase in an orderly and controlled fashion. Much of the user load will be on ticket servers. The ticket servers do not process the financial transaction, which means the processing requirements on the ticket server are lower, and the cost and size of the ticket server are lower. The capacity for concurrent users can be much higher when the peripheral events are handled by a ticket server and a doorman server, and the financial transactions handled by the checkout server are timed to avoid overload. Purchase tickets are distributed over a period of time, allowing a greater number of customers to be able to have a chance at getting a purchase ticket. Purchase tickets can be used as a reward to customers for purchasing a different item from a retailer. Or, purchase tickets can include bonus items or discounts for a related item. Customers will be happier because it will be less stressful to obtain a ticket, and once a customer obtains a ticket, they are guaranteed to get the purchase item as long as they check in to the doorman server on or after the predetermined time. Retailers will be happier because they will be able to sell high-demand items in a controlled manner, without alienating customers.

Figure 2:
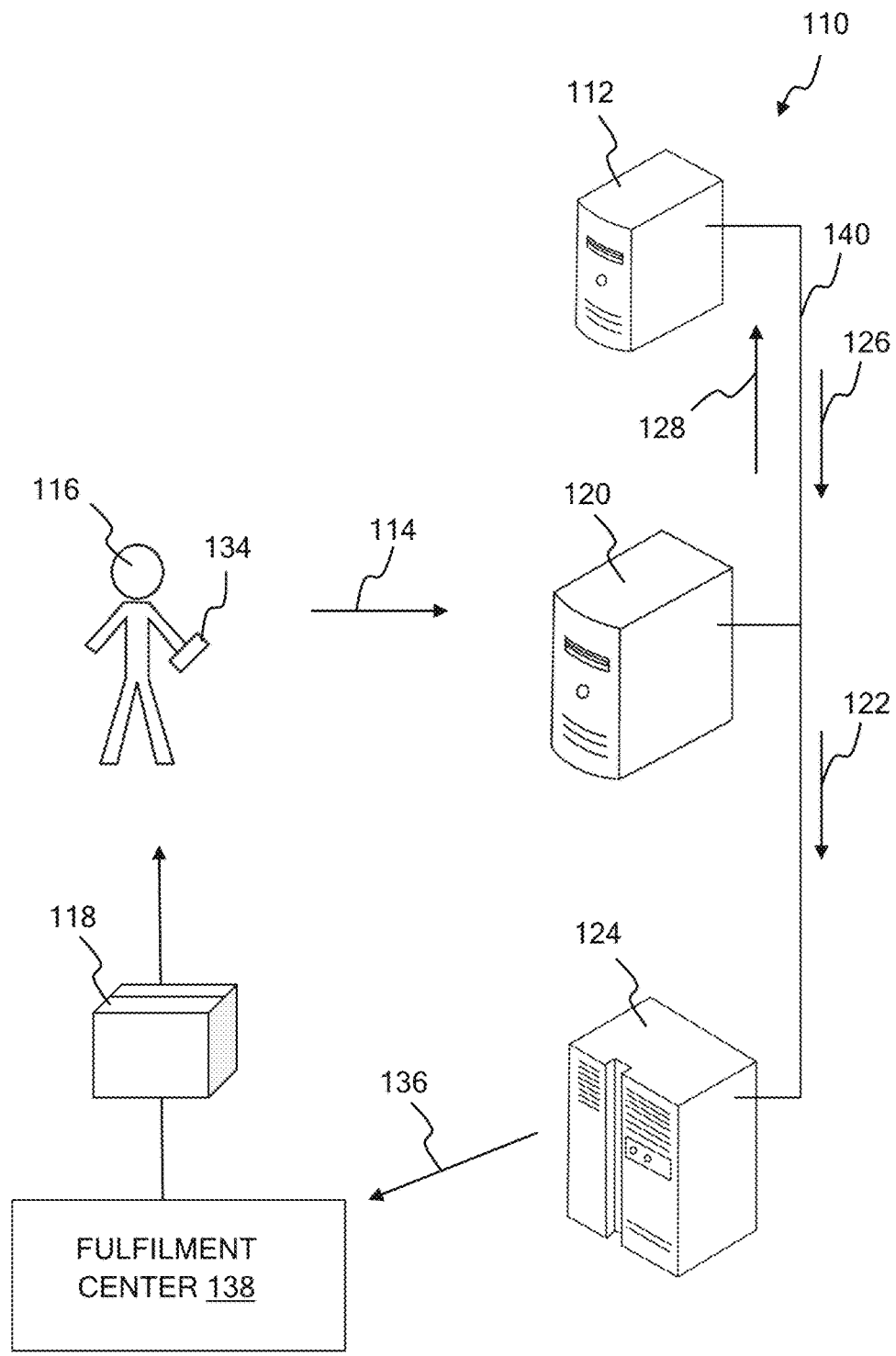
FIG. 2 shows another simplified drawing of a system for executing on-line purchases.
Figure 3:
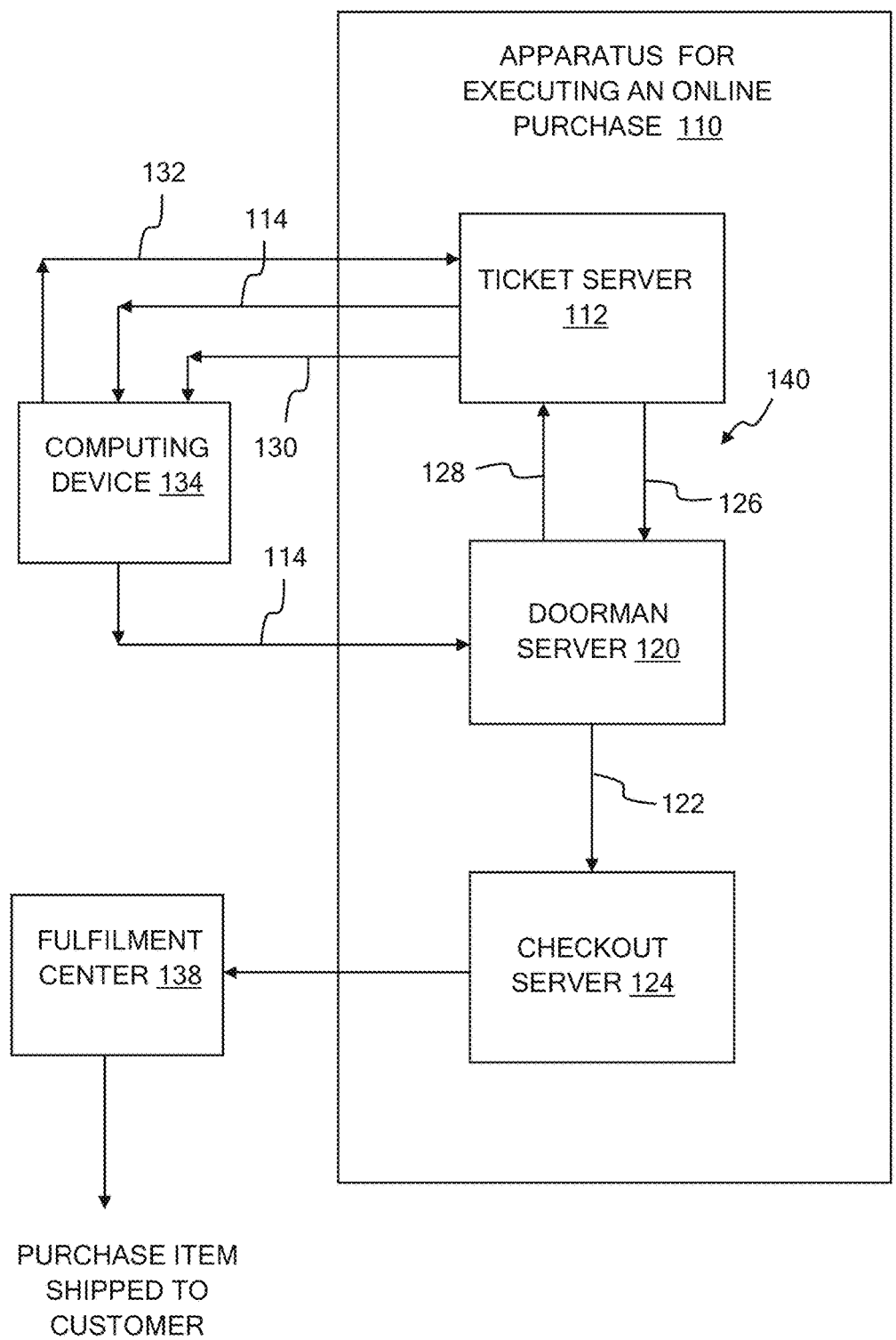
FIG. 3 shows a block diagram of a system for executing on-line purchases.

FIG. 1 and FIG. 2 show a simplified illustration of an apparatus for executing on-line purchases 110. FIG. 3 shows a block diagram of apparatus for executing on-line purchases 110. Apparatus 110 includes a ticket server 112, a doorman server 120, and a checkout server 124. Ticket server 112, doorman server 120, and checkout server 124 are in network communication with each other via network 140. Network 140 is a wired network in the embodiment shown in FIG. 1 through FIG. 3, but this is not meant to be limiting. In some embodiments, network 140 is a wireless network. Ticket server 112 handles the purchase requests from customers, gives customers purchase tickets if inventory is available, and schedules times for redemption of the purchase tickets and completion of the financial transaction. Doorman server 120 receives the purchase tickets from customers for redemption, determines if the purchase ticket is valid and if the predetermined redemption time has passed, and sends an approval to complete the financial transaction to checkout server 124. Checkout server 124 completes the purchase transaction by executing the financial transaction and approving product delivery.

A customer 116 as shown in FIG. 1 and FIG. 2 wishes to purchase a purchase item 118 (FIG. 2). Customer 116 uses a computing device 134 to submit a purchase request 132 to ticket server 112, as shown in FIG. 1. Customer 116 uses computing device 134, which in this embodiment is a handheld mobile computing device. Computing device 134 can be any computing device that can be configured to log on to a website or otherwise submit a purchase request 132 to ticket server 112, such as a desktop or laptop computer, a mobile computing device such as a tablet, smartphone, or wireless communicator, a server, or any other computing device. In this embodiment customer 116 submits purchase request 132 by logging on to a retailer website with computing device 134 and using the website of the retailer to search for purchase item 118, put it in their shopping cart, and request checkout. Customer 116 does not usually know they are using ticket server 112, they just see feedback and instructions for the purchase on the display of computing device 134. Ticket server 112 is used by the retailer to receive purchase request 132 and execute the purchases of purchase item 118. In some embodiments, ticket server 112 is a plurality of ticket servers 112 used by the retailer to receive purchase requests 132. Because ticket server 112 is not going to handle the checkout process, ticket server 112 can be a lower speed and capacity server that would be required to handle financial transactions.

Computing device 134 is communicatively coupled to apparatus 110. In this embodiment, computing device 134 is wirelessly coupled to apparatus 110 via the internet, but this is not mean to be limiting. Computing device 134 can be wired or wirelessly coupled to apparatus 110 in any way which will allow computing device 134 to send purchase request 114 from apparatus 110, and receive and send purchase ticket 114 from apparatus 110.

Once ticket server 112 receives purchase request 132 from customer 116, as shown in FIG. 1 and FIG. 3, ticket server 112 will check to make sure that there are still purchase items 118 in inventory to be sold. If there are still purchase items 118 in inventory, ticket server 112 creates a purchase ticket 114 to be sent to customer 116 through computing device 134. Purchase ticket 114 is the ticket which verifies that customer 116 has secured the right to purchase one (or other specified number) of purchase items 118. The term 'ticket' as used herein means any ticket, voucher, certificate, rain check, receipt, or other item which is given to customer 116, in either electronic or paper form, and can be traded at a later time for purchase item 118. If purchase items 118 are out of inventory, ticket server 112 will send a message to computing device 134 that purchase item 118 is no longer available, and the process will end.

If purchase item 118 is still in inventory, ticket server 112 will complete the process of creating and delivering purchase ticket 114 to customer 116. Purchase ticket 114 is associated with a predetermined redemption time, which is the time on or after which customer 116 may present purchase ticket 114 in order to complete the purchase of purchase item 118. Assigning a predetermined redemption time to each purchase ticket 114 issued by ticket server 112 provides a way to control the number of concurrent customers trying to buy purchase item 118. Purchase ticket 114 is also associated with the quantity of purchase items 118 that are associated with purchase request 132 (whatever quantity is requested and/or allowed according to purchase request 132). Once customer 116 has their purchase ticket 114, there is no reason to finish the purchase in a hurry, which would overload the checkout server. Customer 116 is assured of receiving their product 118 as long as they present their purchase ticket 114 on or after the predetermined redemption time.

Ticket server 112 determines the predetermined redemption time to be associated with purchase ticket 114 by determining a time after which ticket server 112 should be completed with processing most or all of the purchase tickets issued prior to purchase ticket 114. Ticket server 112 schedules the predetermined redemption times for each purchase ticket so that redemptions are spread out over hours or days, whatever time is necessary to ensure that checkout server 124 does not become overloaded.

Ticket server 112 verifies or creates an account for customer 116. The customer account can include customer information such as name, address, and the method of payment that will be used for the purchase. Ticket server 112 collects as much information as it can, so that checkout server 124 does not need to collect this information.

Ticket server 112 delivers purchase ticket 114 to computing device 134 for use by customer 116, as shown in FIG. 1 and FIG. 3. Purchase ticket 114 is often an electronic ticket, but can be a paper ticket or any other form of ticket used now or in the future for future redemption for a product. Purchase ticket 114 is associated with a predetermined redemption time, and a number of purchase items 118, in this embodiment one purchase item 118. Customer 116 can complete the purchase of purchase item 118 by presenting purchase ticket 114 to doorman server 120 anytime on or after the predetermined redemption time associated with purchase ticket 114, and before the time indicated by the retailer ending the sale of purchase item 118. In some embodiments, ticket server 118 delivers a reward coupon 130 with purchase ticket 114. Reward coupon 130 can be any type of coupon for a discount or free item, for example, or any type of reward that the retailer may wish to give out.

FIG. 2 and FIG. 3 show the activity that takes place related to redemption of purchase ticket 114. Redemption begins by customer 116 presenting purchase ticket 114 to doorman server 120, using computing device 134. It is to be understood that, just as with ticket server 112, customer 116 does not usually know they are presenting purchase ticket 114 to doorman server 120. Customer 116 is merely following the retailer's instructions to use a redemption website or whatever other process the retailer has put in place to redeem purchase ticket 114. Once purchase ticket 114 is received by apparatus 110 from computing device 134, using whatever process specified by the retailer, the retailer sends purchase ticket 114 to doorman server 120 to begin the redemption process. In some embodiments, doorman server 120 is a plurality of doorman servers 120.

Doorman server 120 is used to validate and approve the redemption of ticket 114 for purchase item 118. Doorman server 120 is in network communication with ticket server 112 and checkout server 124, using network 140 in this embodiment. Doorman server 120 first validates purchase ticket 114, then issues a purchase approval indicator 122 to checkout server 124. Doorman server 120 validates purchase ticket 114 by checking the time, and checking with ticket server 112 to validate that purchase ticket 114 is being presented by customer 116. Doorman server 120 sends a ticket validation request 128 to ticket server 112 in response to doorman server 120 receiving purchase ticket 114 from computing device 134. Ticket server 112 determines whether purchase ticket 114 is valid, by cross-checking customer information, for example, or any other customer validation process. Ticket server 112 is validating purchase ticket 114 so that fraudulent purchase tickets cannot be presented to doorman server 120. Once ticket server 112 has determined that purchase ticket 114 is a valid purchase ticket, ticket server 112 sends a ticket validation indicator 126 to doorman server 120. Ticket server 112 sends ticket validation indicator 126 to doorman server 120 in response to ticket server 112 receiving ticket validation request 128 from doorman server 120, and ticket server 112 determining that purchase ticket 114 is valid.

Doorman server 120 also checks that the predetermined redemption time associated with purchase ticket 114 has passed. If purchase ticket 114 is presented to doorman server 120 before the predetermined redemption time has passed, then doorman server 120 sends a message to computing device 134 to present purchase ticket 114 at a later time.

Once doorman server 120 has checked that the predetermined redemption time has passed, and received ticket validation indicator 126 from ticket server 112, doorman server 120 issues purchase approval indicator 122 to checkout server 124, and passes the transaction activity to checkout server 124. Customer 116 is usually not aware of the transfer of tasks and information between ticket sever 112, doorman server 120, and checkout server 124. Doorman server 120 issues purchase approval indicator 122 in response to purchase ticket 114 being presented to doorman server 120 on or after the predetermined redemption time, and doorman server 120 receiving ticket validation indicator 126 from ticket server 112.

Checkout server 124 executes the online purchase of purchase item 118 for customer 116 in response to checkout server 124 receiving purchase approval indicator 122 from doorman server 120. Executing the online purchase of purchase item 118 can include a number of different items, but in this embodiment, executing the online purchase of purchase item 118 includes completing the financial transaction for the purchase of purchase item 118, meaning checkout server 124 collects an on-line payment for the purchase of purchase item 114. And, in this embodiment, checkout server 124 sends a purchase payment complete indicator 136 to a fulfillment center 138.

Completing the financial transaction for the purchase of purchase item 118 is often the most processor-intensive part of the purchase process, and the step that overloads servers most often. But, because the preliminary data-gathering and validation was completed by ticket server 112 and doorman server 120, and because the presentation of purchase ticket 114 was timed by ticket server 112, checkout server 124 is not overloaded, and is able to complete the scheduled transactions accurately and methodically. Checkout server 124 collects on-line payment for purchase item 118 from customer 116, and sends purchase payment complete indicator 136 to fulfilment center 138.

In this embodiment, fulfilment center 138 ships purchase item 118 to customer 116 in response to receiving purchase payment complete indictor 136 from checkout server 124. It is to be understood that the delivery of purchase item 118 can take many forms, and the shipment of purchase item 118 as shown in this embodiment is just an example. In some embodiments, purchase item 118 is a digitally stored or electronic item, and can be delivered to computing device 134 by checkout server 124. In some embodiments, checkout server 124 passes delivery of purchase item 118 to another server or computing device. In some embodiments, customer 116 may have arranged for pickup of purchase item 118 at a brick and mortar store. There are many ways for purchase item 118 to be delivered. Once checkout server 124 processes the payment for purchase item 124 and issues purchase payment complete indicator 136, delivery can take any form necessary according to the specific purchase item 118 to be delivered and the delivery instructions from customer 116.

Ticket server 112 and doorman server 120 can be smaller, lower processing speed and capability servers than checkout server 124. Ticket server 112 is handling much of the concurrent users trying to find and schedule a purchase of purchase item 118. But ticket server 112 does not have to handle the financial transaction. Often, one or more smaller size, lower cost, and lower processing speed ticket server 112 is able to handle the tasks required of ticket server 112. In this embodiment, ticket server 112 is a commercial off-the-shelf server with a size smaller than the size of doorman server 120. Doorman server 120 in this embodiment is also a commercial, off-the-shelf server with a size smaller than checkout server 124. Checkout server 124 in this embodiment is a custom built rack-mount server that is larger than both doorman server 120 and ticket server 112. Apparatus for executing on-line purchases 110 can have an overall size and cost lower than a system that uses multiple high-performance servers to handle the purchase tasks from beginning to end. In some embodiments, checkout server 124 is a plurality of checkout servers 124.

It is also to be understood that ticket server 112, doorman server 120 and checkout server 124 may communicate other forms and types of data between themselves, using network 140, for example, besides what is described and shown in the figures. For example, in some embodiments, purchase ticket 114 is transferred between ticket server 112, doorman server 120, and checkout server 124. In some embodiments, other data is transferred between these servers.

In some embodiments, purchase ticket 114 is provided as a reward or gift for purchasing another item. For example, when a first product is purchased, customer 116 can be issued purchase ticket 114 for purchase of purchase item 118. A retailer can use purchase ticket 114 as an incentive in many different ways.

Apparatus for executing online purchases 110 can handle on-line purchases of high-demand items without getting bogged down and without customers losing their place in line or getting dropped from the process due to server overload. Ticket server 112 and doorman server 120 handle a portion of the tasks. Ticket server 112 issues a purchase ticket 114 to customer 116 with a predetermined redemption time after which purchase ticket 114 may be presented for redemption. Ticket server 112 schedules the predetermined redemption times such that checkout server 124 does not get overloaded with concurrent users wishing to process the financial transaction. Checkout server 124 processes the financial transaction, but does not have to handle a rush of customers searching for purchase item 118 and putting purchase item 118 in their shopping basket. Every customer in contact with checkout server 124 has been assured of obtaining a purchase item and is not competing for a place in line. Apparatus 110 executes on-line purchases quickly and efficiently, minimizes server overload, dropping of customers, and customers losing their place in line. Apparatus 110 can be lower cost and lower size than a usual bank of on-line purchase servers because ticket servers 112 and doorman servers 120 can be lower size and lower speed than checkout servers 124. Apparatus 110 uses fewer custom, high-speed and high-performance checkout servers than a usual bank of on-line purchase servers.

Figure 4:
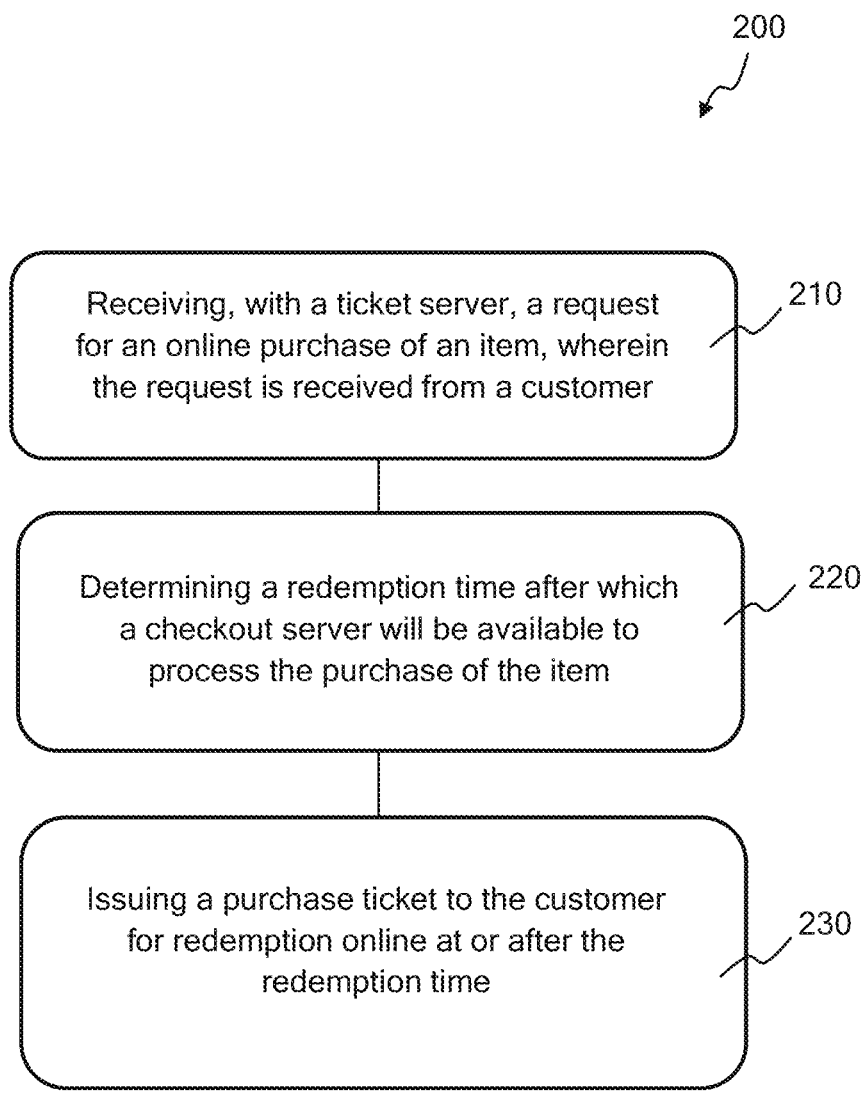
FIG. 4 illustrates a method of handling on-line purchase requests.

FIG. 4 illustrates a method 200 of handling on-line purchase requests. Method 200 includes an act 210 of receiving, with a ticket server, a purchase request for an on-line purchase of an item. The purchase request is received from a customer. In some embodiments, the purchase request is received by a computing device controlled by or operated by the customer. Method 200 also includes an act 220 of determining a redemption time after which a checkout server will be available to process the purchase of the item. The checkout server is a different server from the ticket server. The ticket server and the checkout server are in network communication. And method 200 includes an act 230 of issuing a purchase ticket to the customer for redemption on-line at or after the redemption time.

Method 200 can include many other acts. In some embodiments, method 200 includes an act of approving the purchase ticket with a doorman server, where the doorman server is in network communication with the ticket server. The doorman server and the ticket server are different servers. In some embodiments, approving the purchase ticket with a doorman server includes an act of sending, with the doorman server, a ticket validation request via network to the ticket server. In some embodiments, approving the purchase ticket with a doorman server includes an act of determining, with the ticket server, that the purchase ticket is valid. In some embodiments, approving the purchase ticket with a doorman server includes an act of sending, with the ticket server, a ticket validation indicator via network to the doorman server. In some embodiments, approving the purchase ticket with a doorman server includes an act of determining, with the doorman server, that the redemption time has arrived. In some embodiments, approving the purchase ticket with a doorman server includes an act of sending a purchase approval indicator via network connection from the doorman server to the checkout server.

In some embodiments, method 200 includes an act of executing the on-line purchase with the checkout server in response to the checkout server receiving, via network communication, a purchase approval indicator from the doorman server. In some embodiments, method 200 includes an act of issuing a reward coupon with the purchase ticket.

Figure 5:
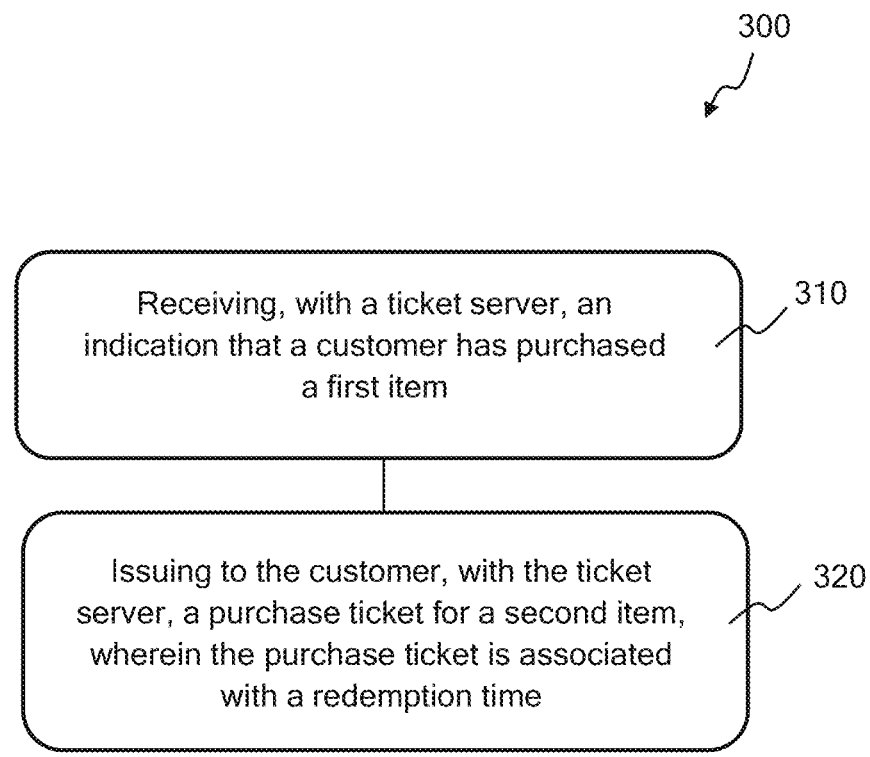
FIG. 5 illustrates a method of issuing a purchase reward.

FIG. 5 illustrates a method 300 of issuing a purchase reward. Method 300 includes an act 310 of receiving, with a ticket server, an indication that a customer has purchased a first item. Method 300 of issuing a purchase reward also includes an act 320 of issuing to the customer, with the ticket server, a purchase ticket for a second item, where the purchase ticket is associated with a redemption time.

Method 300 can include many other acts. In some embodiments, method 300 includes an act of approving the purchase ticket with a doorman server, where the doorman server is in network communication with the ticket server. In some embodiments, approving the purchase ticket with a doorman server includes an act of sending, with the doorman server, a ticket validation request via network to the ticket server. In some embodiments, approving the purchase ticket with a doorman server includes an act of determining, with the ticket server, that the purchase ticket is valid. In some embodiments, approving the purchase ticket with a doorman server includes an act of sending, with the ticket server, a ticket validation indicator via network to the doorman server. In some embodiments, approving the purchase ticket with a doorman server includes an act of determining, with the doorman server, that the redemption time has arrived. In some embodiments, approving the purchase ticket with a doorman server includes an act of sending a purchase approval indicator via network connection from the doorman server to a checkout server, where the checkout server is a different server than the ticket server and the doorman server, and is in network communication with both. In some embodiments, method 300 includes an act of executing the purchase of the second item, with the checkout server, in response to the checkout server receiving the purchase approval indication, via network communication, from the doorman server.

In some embodiments, act 320 of method 300 includes an act of determining a redemption time after which the checkout server will be available to execute the purchase of the second item. In some embodiments, act 320 of method 300 includes an act of issuing the purchase ticket to the customer, wherein the purchase ticket may be redeemed for the second item on or after the redemption time.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An apparatus for executing on-line retail purchases, the apparatus comprising:
   a ticket server, wherein the ticket server issues a purchase ticket to a customer, wherein the purchase ticket comprises a predetermined redemption time, and wherein the purchase ticket is associated with a purchase item;
   a doorman server in network communication with the ticket server, wherein the doorman server issues a purchase approval indicator in response to both of: a) the purchase ticket being presented to the doorman server on or after the predetermined redemption time, and b) the doorman server receiving a ticket validation indicator from the ticket server, wherein the ticket server sends the ticket validation indicator to the doorman server in response to the ticket server receiving a ticket validation request from the doorman server, and the ticket server determining that the purchase ticket is valid; and
   a checkout server in network communication with the doorman server; wherein the checkout server executes an on-line purchase of the purchase item in response to the checkout server receiving the purchase approval indicator from the doorman server.

2. The apparatus of claim 1, wherein the checkout server is in network communication with the ticket server.

3. The apparatus of claim 1, wherein a size of the ticket server is smaller than a size of the doorman server.

4. The apparatus of claim 3, wherein a size of the doorman server is smaller than a size of the checkout server.

5. The apparatus of claim 4, wherein the checkout server is a rack-mount server.

6. The apparatus of claim 1, wherein the checkout server executing an on-line purchase of the purchase item comprises the checkout server collecting on-line payment for the purchase item, and the checkout server sending a purchase payment complete indicator to a fulfillment center.

7. The apparatus of claim 1, wherein the ticket server issues a reward coupon with the purchase ticket.

8. The apparatus of claim 1, wherein the purchase item is a first purchase item, and wherein the ticket server issues the purchase ticket to the customer in response to the customer purchasing a second purchase item.

9. The apparatus of claim 1, wherein the purchase ticket is issued to a computing device operated by the customer.

\* \* \* \* \*